(12) United States Patent
Matsuzawa (10) Patent No.: US 8,044,112 B2
(45) Date of Patent: Oct. 25, 2011

(54) METHOD FOR APPLYING A COATING ONTO A SILICONE HYDROGEL LENS

(75) Inventor: Yasuo Matsuzawa, Roswell, GA (US)

(73) Assignee: Novartis AG, Basel (CH)

( * ) Notice: Subject to any disclaimer, the term of this patent is extended or adjusted under 35 U.S.C. 154(b) by 1016 days.

(21) Appl. No.: 11/726,194

(22) Filed: Mar. 21, 2007

(65) Prior Publication Data

US 2007/0229758 A1 Oct. 4, 2007

Related U.S. Application Data

(60) Provisional application No. 60/787,580, filed on Mar. 30, 2006.

(51) Int. Cl.
| | |
|---|---|
| *G02B 1/04* | (2006.01) |
| *G02B 1/10* | (2006.01) |
| *C08F 290/04* | (2006.01) |
| *G02C 7/04* | (2006.01) |
| *B05D 5/00* | (2006.01) |
| *B05D 1/38* | (2006.01) |
| *B32B 9/04* | (2006.01) |
| *B32B 27/08* | (2006.01) |

(52) U.S. Cl. .... 523/105; 523/106; 523/107; 351/160 H; 351/160 R; 427/162; 427/407.1; 428/447; 428/500

(58) Field of Classification Search .......... 523/106, 523/107, 108, 105; 351/160 H, 160 R; 427/162, 427/407.1; 428/447, 500

See application file for complete search history.

(56) References Cited

U.S. PATENT DOCUMENTS

| | | | |
|---|---|---|---|
| 4,168,112 A | 9/1979 | Ellis et al. | 351/160 |
| 4,321,261 A | 3/1982 | Ellis et al. | 424/180 |
| 4,941,997 A | 7/1990 | Decher et al. | 252/586 |
| 4,973,429 A | 11/1990 | Decher et al. | 252/587 |
| 5,068,318 A | 11/1991 | Decher et al. | 534/573 |
| 5,208,111 A | 5/1993 | Decher et al. | 428/420 |
| 5,518,767 A | 5/1996 | Rubner et al. | 427/259 |
| 5,529,787 A | 6/1996 | Merrill et al. | 264/1.36 |
| 5,535,908 A | 7/1996 | Sheu | 428/319.7 |
| 5,536,573 A | 7/1996 | Rubner et al. | 428/378 |
| 5,882,687 A | 3/1999 | Park et al. | 424/682 |
| 6,011,082 A | 1/2000 | Wang et al. | 523/107 |
| 6,087,415 A | 7/2000 | Vanderlaan et al. | 524/105 |
| 6,428,839 B1 | 8/2002 | Kunzler et al. | 427/2.1 |
| 6,451,871 B1 | 9/2002 | Winterton et al. | 523/106 |
| 6,531,432 B2 | 3/2003 | Molock et al. | 510/112 |
| 6,589,665 B2 | 7/2003 | Chabrecek et al. | 428/520 |

(Continued)

FOREIGN PATENT DOCUMENTS

EP  0 032 443  5/1985

(Continued)

OTHER PUBLICATIONS

International Search Report.

(Continued)

*Primary Examiner* — Mark Eashoo
*Assistant Examiner* — Michael Pepitone
(74) *Attorney, Agent, or Firm* — Jian Zhou (57) ABSTRACT

The invention provides a cost-effective method for making a silicone hydrogel contact lens having an LbL coating thereon that is not covalently attached to the lens and has good hydrophilicity, intactness and durability. The method comprises LbL coating at high temperature.

20 Claims, 2 Drawing Sheets

U.S. PATENT DOCUMENTS

| | | | |
|---|---|---|---|
| 6,689,480 B2 | 2/2004 | Shimoyama et al. | 428/451 |
| 6,699,435 B2 | 3/2004 | Salpekar et al. | 422/40 |
| 6,719,929 B2 | 4/2004 | Winterton et al. | 264/1.7 |
| 6,793,973 B2 | 9/2004 | Winterton et al. | 427/393.5 |
| 6,811,805 B2 | 11/2004 | Gilliard et al. | 427/2.1 |
| 6,815,074 B2 | 11/2004 | Aguado et al. | 428/447 |
| 6,827,966 B2 | 12/2004 | Qiu et al. | 427/2.24 |
| 6,858,248 B2 | 2/2005 | Qiu et al. | 427/2.24 |
| 6,893,685 B2 | 5/2005 | Qiu et al. | 427/407 |
| 6,896,926 B2 | 5/2005 | Qiu et al. | 427/2.31 |
| 6,926,965 B2 | 8/2005 | Qiu et al. | 428/411.1 |
| 6,940,580 B2 | 9/2005 | Winterton et al. | 352/160 |
| 7,022,379 B2 | 4/2006 | Winterton et al. | 427/307 |
| 7,211,149 B2 | 5/2007 | Qiu et al. | 118/429 |
| 2001/0045676 A1 | 11/2001 | Winterton et al. | 264/2.5 |
| 2001/0048975 A1 | 12/2001 | Winterton et al. | 427/412.1 |
| 2002/0006493 A1 | 1/2002 | Chabrecek et al. | 428/64.1 |
| 2002/0086160 A1 | 7/2002 | Qiu et al. | 428/413 |
| 2002/0182316 A1 | 12/2002 | Gilliard et al. | 427/162 |
| 2002/0190407 A1* | 12/2002 | Gilliard et al. | 264/2.6 |
| 2003/0008154 A1 | 1/2003 | Aguado et al. | 428/447 |
| 2003/0012872 A1 | 1/2003 | Qiu et al. | 427/162 |
| 2003/0039742 A1 | 2/2003 | Qiu et al. | 427/2.1 |
| 2003/0052424 A1 | 3/2003 | Turner et al. | 264/1.32 |
| 2003/0117579 A1 | 6/2003 | Morris et al. | 351/200 |
| 2003/0125498 A1 | 7/2003 | McCabe et al. | 528/25 |
| 2003/0134132 A1 | 7/2003 | Winterton et al. | 428/451 |
| 2003/0162862 A1 | 8/2003 | McCabe et al. | 523/106 |
| 2003/0219909 A1 | 11/2003 | Lally et al. | 547/529 |
| 2004/0135967 A1 | 7/2004 | Carney et al. | 351/159 |
| 2005/0008676 A1 | 1/2005 | Qiu et al. | 424/429 |

FOREIGN PATENT DOCUMENTS

| | | |
|---|---|---|
| EP | 0 138 385 | 4/1990 |
| EP | 0 995 762 | 4/2000 |
| EP | 1 153 964 B1 | 7/2006 |
| GB | 2 102 070 | 1/1983 |
| JP | 1-158412 | 6/1989 |
| JP | 5-318118 | 12/1993 |
| JP | 07256844 | 10/1995 |
| WO | WO 95/00618 | 1/1995 |
| WO | WO 95/02251 | 1/1995 |
| WO | WO 95/20407 | 8/1995 |
| WO | WO 96/18498 | 6/1996 |
| WO | WO 96/31792 | 10/1996 |
| WO | WO 96/37241 | 11/1996 |
| WO | WO 99/35520 | 7/1999 |
| WO | WO 01/57118 | 8/2001 |
| WO | WO 01/92924 | 12/2001 |
| WO | WO 02/16974 | 2/2002 |
| WO | WO 02/097481 A1 | 12/2002 |
| WO | WO 03/066714 | 8/2003 |
| WO | WO 2004/024203 | 3/2004 |
| WO | WO 2004/056404 | 7/2004 |

OTHER PUBLICATIONS

Written Opinion of the International Searching Authority.
Standard Search Report.
Decher, Lehr, Lowack, Lvov & Schmitt, "New Nanocomposite Films for Biosensors: layer by Layer adsorbed films of polyelectrolytes, proteins or DNA", 1994, pp. 677-684.
Sukhorukov, Mohwald, Decher and Lvov, "Assembly of Polyelectrolyte Multilayer films by consecutively alternating adsorption of Polynucleotides and Polycations", 1996, pp. 220-223.
Uchida, Kunitake, and Kajiyama, "Blood Compatibility—Surface Characteristic Relationships of a Langmuir-Blodgett Film COmposed of an Anionic Amphiphile-Polycation COmplex", 1994, pp. 199-211.
Onitsuka, Fou, Ferreira, Hsieh, and Rubner, "Enhancement of Light Emitting Diodes Based on Self-Assembled Heterostructures of Poly(p-PHenylene Vinylene)", 1996, pp. 4067-4071.
Yoo, Lee and Rybner, "Investigations of New Self-Assembled MultiLayer Thin Films Based on Alternately Adsorbed Layers of Polyelectrolytes and Functional Dye Molecules", 1996, pp. 395-400.
Yoo, Wu, Lee and Rubner, "New Electro-Active Self-Assembled MultiLayer Thin Films Based on Alternately Adsorbed Layers of Polyelectrolytes and Functional Dye Molecules", 1997, pp. 1425-1426.
Yoo & rubner, "Layer-By-Layer Modification of Surfaces Through the USe of Self Assembled Monolayers of Polyions", 1995, pp. 2568-174.
Ferreira and Rubner, "Molecular Level Processing of Conjugated Polymers. Layer by Layer Manipulation of Conjugated Polyions", 1995, pp. 7107-7114.
Fou and Rubner, "Molecular Level Processing of Conjugated Polymers. Layer by Layer Manipulation of In-Situ Polymerized p-Type Doped Conducting Polymers", 1995, pp. 7115-7120.
Cheung, Stockton & Rubner, "Molecular Level Processing of Conjugated Polymers. Layer by Layer Manipulation of Polyanilene via Electrostatic Interactions", 1995, pp. 2712-2716.
Cheung, Fou, Ferreira and Rubner, "Molecular Self Assembly of Conducting Polymers: A New Layer by Layer Thin Film Deposition Process", pp. 757-758.
Vargo, Clavert, Wynne, Avlyanov, MacDiarmid, and Rubner, "Patterned Polymer multilayer Fabrication by Controlled Adhesion of Polyelectrolytes to Plasma modified Fluoropolymer Surfaces", 1996, pp. 169-174.
Hirotusuga, Yasuda, "Biocompatibility of Nonofilm-Encapsulated Silicone and Silicone-Hydrogel Contact Lenses", 2006, pp. 121-138.
Winterton, Lynn, et al., Coating for Biomedical Devices, Abstracts of Papers, $223^{rd}$ ACS National Meeting, Orlando, FL, Apr. 7-11, 2002, coil-392, publisher; American Chemical Society, Washington, DC.

* cited by examiner

METHOD FOR APPLYING A COATING ONTO A SILICONE HYDROGEL LENS

This application claims the benefit under 35 U.S.C. §119 (e) of U.S. provisional application Ser. No. 60/787,580 filed Mar. 30, 2006, herein incorporated by reference in its entirety.

The present invention generally relates to a method for applying a coating of hydrophilic polymers onto a silicone hydrogel contact lenses to improve its hydrophilicity and lubricity. In addition, the present invention provides a silicone hydrogel contact lens having a hydrophilic coating with a good intactness and durability.

BACKGROUND OF THE INVENTION

In recent years, soft silicone hydrogel contact lenses, for example, Focus NIGHT & DAY™ and O2OPTIX™ (CIBA VISION), and PureVision™ (Bausch & Lomb) become more and more popular because of their high oxygen permeability and comfort. "Soft" contact lenses conform closely to the shape of the eye, so oxygen cannot easily circumvent the lens. Soft contact lenses must allow oxygen from the surrounding air (i.e., oxygen) to reach the cornea because the cornea does not receive oxygen from the blood supply like other tissue. If sufficient oxygen does not reach the cornea, corneal swelling occurs. Extended periods of oxygen deprivation cause the undesirable growth of blood vessels in the cornea. By having high oxygen permeability, a silicone hydrogel contact lens allows sufficient oxygen permeate through the lens to the cornea and to have minimal adverse effects on corneal health.

However, a silicone hydrogel material typically has a surface or at least some areas of its surface which is hydrophobic (non-wettable). Lipids or proteins from the ocular environment can be adsorbed onto hydrophobic surface or surface areas of a silicone hydrogel contact lens. The hydrophobic surface or surface areas of a silicone hydrogel contact lens may cause it be adhered to the eye. Thus, a silicone hydrogel contact lens will generally require a surface modification to increase surface hydrophilicity. High hydrophilicity and lubricity of an LbL coating on a contact lens may enhance wearer's comfort and/or ocular health.

A known method for modifying the hydrophilicity of a relatively hydrophobic contact lens material is through the use of a plasma treatment, for example, commercial lenses such as Focus NIGHT & DAY™ and O2OPTIX™ (CIBA VISION), and PureVision™ (Bausch & Lomb). Advantages of a plasma coating is its durability, relatively high hydrophilicity (or good wettability), and low susceptibility to lipid and protein deposition and adsorption. But, plasma treatment of silicone hydrogel contact lenses may not be cost effective, because the preformed contact lenses must be dried before plasma treatment and because of relative high capital investment associated with plasma treatment equipments.

Another method for modifying the hydrophilicity of a relatively hydrophobic contact lens material is a layer-by-layer (LbL) polyionic material deposition technique (see for example, U.S. Pat. Nos. 6,451,871, 6,717,929, 6,793,973, 6,884,457, 6,896,926, 6,926,965, 6,940,580). Although this technique can provide a cost effective process for rendering a silicone hydrogel material wettable, it may require relatively long time and laborious steps to apply an LbL hydrophilic coating which can impart hydrophilicity and lubricity to a silicone hydrogel contact lens. The reported methods for applying an LbL coating to a silicone hydrogel contact lens may not provide a surface with desired hydrophilicity, lubricity, durability, and/or full surface coverage (i.e., intactness).

Therefore, there is still need for methods of efficiently applying a hydrophilic coating to a silicone hydrogel contact lens.

SUMMARY OF THE INVENTION

The invention, in one aspect, provides a method of applying a hydrophilic coating onto a silicone hydrogel contact lens, the method of invention comprising: (a) contacting the contact lens with a first coating solution having a temperature of from about 45° C. to about 95° C. to form a prime coating which is not covalently attached to the contact lens, wherein the first coating solution includes a polyaionic material having a first hydrophobic backbone and multiple ionizable pendant groups, wherein the first coating solution has a pH sufficient low to substantially prevent the ionizable groups from ionizing, wherein the prime coating comprises at least one layer of the polyanionic material; and (b) contacting said contact lens with a second coating solution having a temperature of from about 45° C. to about 95° C. to form a top coating over the prime coating, wherein the second coating solution contains a non-charged hydrophilic polymer having a second hydrophobic backbone, wherein the top coating comprises at least one layer of the hydrophilic polymer.

In another aspect, the invention provides a method for making a silicone hydrogel contact lens, comprising the steps of: (a) cast-molding a silicone hydrogel contact lens from a silicone hydrogel lens-forming material, wherein the silicone-hydrogel lens-forming material comprises at least one member selected from the group consisting of a silicone-containing vinylic monomer, a silicone-containing macromer with ethylenically unsaturated groups, a crosslinkable silicone-containing prepolymer, and mixtures thereof; (b) contacting the contact lens with a first coating solution having a temperature of from about 45° C. to about 95° C. to form a prime coating which is not covalently attached to the contact lens, wherein the first coating solution includes a polyionic polymeric material having a first hydrophobic backbone and multiple ionizable or charged pendant groups, wherein the prime coating comprises at least one layer of the polyanionic material; and (c) contacting said contact lens with a second coating solution having a temperature of from about 45° C. to about 95° C. to form a top coating over the prime coating, wherein the second coating solution contains a non-charged hydrophilic polymer having a second hydrophobic backbone, wherein the top coating comprises at least one layer of the hydrophilic polymer.

In a further aspect, the invention provides a silicone hydrogel contact lens. The contact lens of the invention comprises a core silicone hydrogel material and a hydrophilic coating, wherein the core silicone hydrogel material is the copolymerization product of a silicone hydrogel lens-forming material, wherein the silicone-hydrogel lens-forming material comprises at least one member selected from the group consisting of a silicone-containing vinylic monomer, a silicone-containing macromer with ethylenically unsaturated groups, a crosslinkable silicone-containing prepolymer, and mixtures thereof, wherein the hydrophilic coating is not covalently attached to the core silicone hydrogel material and comprises one innermost layer of a polyanionic material with a first hydrophobic backbone and one outmost layer of a non-charge hydrophilic polymer with a second hydrophobic backbone, wherein the silicone hydrogel contact lens has an oxygen permeability of at least 40 barres, a wettable surface characterized by an averaged water contact angle of 80 degrees or less and a good coating durability characterized by surviving a digital rubbing test or repeated autoclave test.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing vinylic monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

The term "olefinically unsaturated group" is employed herein in a broad sense and is intended to encompass any groups containing at least one >C=C< group. Exemplary ethylenically unsaturated groups include without limitation acryloyl, methacryloyl, allyl, vinyl, styrenyl, or other C=C containing groups.

As used herein, "actinically" in reference to curing or polymerizing of a polymerizable composition or material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight water.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains functional groups capable of undergoing further polymerizing and/or crosslinking reactions. Medium and high molecular weight typically means average molecular weights greater than 700 Daltons. Preferably, a macromer contains ethylenically unsaturated groups and can be polymerized actinically or thermally.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer.

A "crosslinkable prepolymer" refers to a starting polymer which can be crosslinked upon actinic radiation to obtain a crosslinked polymer having a molecular weight much higher than the starting polymer.

A "crosslinkable silicone-containing prepolymer" refers to a starting polymer which contains silicone and can be crosslinked upon actinic radiation to obtain a crosslinked polymer having a molecular weight much higher than the starting polymer.

A "polymer" means a material formed by polymerizing/crosslinking one or more monomers.

A "backbone" of a polymer refers to the principle chain in a polymer molecule.

An "initiator" is intended to describe a chemical that initiates free radical reaction and can be a photoinitiator or thermal initiator.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis(isobutyronitrile) (AIBN).

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the unmasked region.

"Visibility tinting" in reference to a lens means dying (or coloring) of a lens to enable the user to easily locate a lens in a clear solution within a lens storage, disinfecting or cleaning container. It is well known in the art that a dye and/or a pigment can be used in visibility tinting a lens.

The term "fluid" as used herein indicates that a material is capable of flowing like a liquid.

"LbL coating", as used herein, refers to a coating that is not covalently attached to a contact lens or a mold half and is obtained through a layer-by-layer ("LbL") deposition of polyionic (or charged) and/or non-charged materials on the lens or mold half. An LbL coating can be composed of one or more layers, preferably one or more bilayers.

As used herein, a "polyionic material" refers to a polymeric material that has a plurality of charged groups or ionizable groups, such as polyelectrolytes, p- and n-type doped conducting polymers. Polyionic materials include both polycationic (having positive charges) and polyanionic (having negative charges) materials.

The term "bilayer" is employed herein in a broad sense and is intended to encompass: a coating structure formed on a contact lens or a mold half by alternatively applying, in no particular order, one layer of a first polyionic material (or charged material) and subsequently one layer of a second polyionic material (or charged material) having charges opposite of the charges of the first polyionic material (or the charged material); or a coating structure formed on a contact lens or mold half by alternatively applying, in no particular order, one layer of a first charged polymeric material and one layer of a non-charged polymeric material or a second charged polymeric material. It should be understood that the layers of the first and second coating materials (described above) may be intertwined with each other in the bilayer.

Formation of an LbL coating on a contact lens or mold half may be accomplished in a number of ways, for example, as described in U.S. Pat. Nos. 6,451,871, 6,719,929, 6,793,973, 6,811,805, 6,896,926 (herein incorporated by references in their entirety).

An "innermost layer", as used herein, refers to the first layer of an LbL coating, which is applied onto the surface of a contact lens or mold half.

A "capping layer" or "outmost layer", as used herein, refers to the last layer or the sole layer of an LbL coating which is applied onto a contact lens or mold half.

An "average contact angle" refers to a water contact angle (measured by Sessile Drop method), which is obtained by averaging measurements of at least 3 individual contact lenses.

As used herein, "increased surface hydrophilicity" or "increased hydrophilicity" in reference to a coated contact lens means that the contact lens coated at a temperature higher than room temperature (about 22° C.) has a smaller averaged (water) contact angle relative to that of a contact lens coated at room temperature, wherein all contact lenses are made of the same core material and all coating solutions have identical compositions.

As used herein, "surviving a digital rubbing test" in reference to an LbL coating on a contact lens means that after digitally rubbing the lens with Solo-Care® (CIBA Vision) or an equivalent, there is no noticeable increase in staining area on the lens relative to the staining, of a lens of same without rubbing. The stain test is a Sudan Black Stain test described in Example 1. Preferably, "surviving a digital rubbing test" in reference to an LbL coating on a contact lens means that after digitally rubbing the lens with Solo-Care® (CIBA Vision) or an equivalent, averaged contact angle on the rubbed lens is still about 90 degrees or less, preferably about 80 degrees or less, even more preferably about 70 degrees or less, most preferably about 60 degrees or less.

As used herein, "surviving a repeated autoclave test" in reference to an LbL coating on a contact lens means that after autoclaving the lens at about 121° C. for 5 times, each autoclave lasting 30 minutes, there is no noticeable increase in staining area on the lens relative to the staining of a lens of same without repeated autoclave. The stain test is a Sudan Black Stain test described in Example 1. Preferably, "surviving a repeated autoclave test" in reference to an LbL coating on a contact lens means that after autoclaving the lens at about 121° C. for 5 times, each autoclave lasting 30 minutes, averaged contact angle on the rubbed lens is still about 90 degrees or less, preferably about 80 degrees or less, even more preferably about 70 degrees or less, most preferably about 60 degrees or less.

An "antimicrobial agent", as used herein, refers to a chemical that is capable of decreasing or eliminating or inhibiting the growth of microorganisms such as that term is known in the art. Examples of preferred antimicrobial agents include without limitation antimicrobial metals (e.g., Ag, Au, Pt, Pd, Ir, Sn, Cu, Sb, Bi and Zn, with Ag being most preferred), antimicrobial metal-containing nanoparticles (i.e., having a size of less than 1 micrometer and containing at least one antimicrobial metal present in one or more of its oxidation states), and antimicrobial metal nanoparticles (i.e., particles made essentially of an antimicrobial metal and have a size of less than 1 micrometer, such as silver nanoparticles).

The "oxygen transmissibility" of a lens, as used herein, is the rate at which oxygen will pass through a specific ophthalmic lens. Oxygen transmissibility, Dk/t, is conventionally expressed in units of barrers/mm, where t is the average thickness of the material [in units of mm] over the area being measured and "barrer/mm" is defined as:

$$[(cm^3 oxygen)/(cm^2)(sec)(mm^2 Hg)] \times 10^{-9}$$

The intrinsic "oxygen permeability", Dk, of a lens material does not depend on lens thickness. Intrinsic oxygen permeability is the rate at which oxygen will pass through a material. Oxygen permeability is conventionally expressed in units of barrers, where "barrer" is defined as:

$$[(cm^3 oxygen)(mm)/(cm^2)(sec)(mm^2 Hg)] \times 10^{-10}$$

These are the units commonly used in the art. Thus, in order to be consistent with the use in the art, the unit "barrer" will have the meanings as defined above. For example, a lens having a Dk of 90 barrers ("oxygen permeability barrers") and a thickness of 90 microns (0.090 mm) would have a Dk/t of 100 barrers/mm (oxygen transmissibility barrers/mm). In accordance with the invention, a high oxygen permeability in reference to a material or a contact lens characterized by apparent oxygen permeability of at least 40 barrers or larger measured with a sample (film or lens) of 100 microns in thickness according to a coulometric method described in Examples.

The "ion permeability" through a lens correlates with both the Ionoflux Diffusion Coefficient and the Ionoton Ion Permeability Coefficient.

The Ionoflux Diffusion Coefficient, D, is determined by applying Fick's law as follows:

$$D=-n'/(A \times dc/dx)$$

where
n'=rate of ion transport [mol/min]
A=area of lens exposed [mm$^2$]
D=Ionoflux Diffusion Coefficient [mm$^2$/min]
dc=concentration difference [mol/L]
dx=thickness of lens [mm]

The Ionoton Ion Permeability Coefficient, P, is then determined in accordance with the following equation:

$$\ln(1-2C(t)/C(0))=-2APt/Vd$$

where:
C(t)=concentration of sodium ions at time t in the receiving cell
C(0)=initial concentration of sodium ions in donor cell
A=membrane area, i.e., lens area exposed to cells
V=volume of cell compartment (3.0 ml)
d=average lens thickness in the area exposed
P=permeability coefficient An Ionoflux Diffusion Coefficient, D, of greater than about $1.5 \times 10^{-6}$ mm$^2$/min is preferred, while greater than about $2.6 \times 10^{-6}$ mm$^2$/min is more preferred and greater than about $6.4 \times 10^{-6}$ mm$^2$/min is most preferred.

It is known that on-eye movement of the lens is required to ensure good tear exchange, and ultimately, to ensure good corneal health. Ion permeability is one of the predictors of on-eye movement, because the permeability of ions is believed to be directly proportional to the permeability of water.

It has been discovered previously and disclosed in commonly assigned U.S. Pat. No. 6,451,871 that complex and time-consuming pretreatment the surface of a core material (medical device) is not required for rendering the surface of a medical device charged prior to binding of a polyionic polymeric material to the core material. By simply and alternatively contacting a core material of a medical device, for example, a contact lens, with a solution of a first polyionic polymeric material and a solution of a second polyionic polymeric material having charges opposite of the charges of the first charged polymeric material, a multiple-layered LbL coating can be formed on a medical device to modify the surface properties of the core material of the medical device.

Now, it is unexpectedly discovered that the temperature of a coating solution of a coating material with a hydrophobic backbone can have a significant impact on the hydrophilicity, intactness, and durability of an LbL coating not covalently attached onto a contact lens. As the temperature of a coating solution increases, a resulting coating on a contact lens becomes more hydrophilic (e.g., smaller water contact angle), more intact (e.g., significantly less or no Sudan Black staining), more durable (surviving a digital rubbing test or a repeated autoclave test). Based on this unexpected discovery, an improved LbL coating method is developed that can prepare, in a cost-effective and rapid fashion, an LbL coating on a contact lens with increased hydrophilicity, good intactness and good durability.

The invention, in one aspect, provides a method of applying a hydrophilic coating onto a silicone hydrogel contact lens, the method of invention comprising: (a) contacting the contact lens with a first coating solution having a temperature of from about 45° C. to about 95° C. to form a prime coating which is not covalently attached to the contact lens, wherein the first coating solution includes a polyionic material having a first hydrophobic backbone and multiple ionizable or charged pendant groups, wherein the prime coating comprises at least one layer of the polyanionic material; and (b) contacting said contact lens with a second coating solution having a temperature of from about 45° C. to about 90° C. to form a top coating over the prime coating, wherein the second coating solution contains a non-charged hydrophilic polymer having a second hydrophobic backbone, wherein the top coating comprises at least one layer of the hydrophilic polymer.

In accordance with the present invention, an LbL coating can be applied onto a silicone hydrogel contact lens by contacting the lens with one or more coating solutions according to various methods, such as, for examples those methods disclosed in U.S. Pat. Nos. 6,451,871, 6,719,929, 6,793,973, 6,811,805, 6,896,926, which are incorporated herein by references in their entireties.

Contacting of a contact lens with a coating solution can occur by dipping it into the coating solution or by spraying it with the coating solution. One coating process involves solely dip-coating and optionally dip-rinsing steps. Another coating process involves solely spray-coating and spray-rinsing steps. However, a number of alternatives involve various combinations of spray- and dip-coating and rinsing steps may be designed by a person having ordinary skill in the art.

For example, a solely dip-coating process for forming an LbL coating composed of at least one bilayers on a contact lens involves the steps of: (a) immersing a contact lens in a first coating solution of a first coating material; (b) optionally rinsing the mold half by immersing it in water; (c) immersing the lens in a second coating solution of a second coating material to form a first bilayer of the first and second coating materials; (d) optionally rinsing the lens by immersing it in the rinsing solution; and (e) optionally repeating steps (a) to (d) for a number of times to form additional bilayers. A thicker LbL coating can be produced by repeating steps (a) to (d) preferably for a number of times.

The immersion time for each of the coating and optional rinsing steps may last less than about 1 minute, because the coating temperature is relatively high. Preferably, immersion of the core material into a coating solution occurs over a period of from about 3 second to 20 second, more preferably from about 5 seconds to about 10 seconds. Rinsing may be accomplished with a plurality of rinsing steps, but a single rinsing step, if desired, can be quite efficient.

A further exemplary coating process for forming an LbL coating composed of at least one bilayers on a contact lens involves a series of spray coating techniques. For example, a solely spray-coating process generally includes the steps of: (a) spraying the surface of a contact lens with a first coating solution of a first coating material; (b) optionally rinsing the lens surface by spraying it with a rinsing solution; (c) spraying the surface with a second coating solution of a second coating material to form a first bilayer of the first and second coating materials; (d) optionally rinsing the lens surface by spraying it with the rinsing solution; (e) optionally repeating steps (a) to (d) for a number of times.

The spray coating application may be accomplished via a process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process; and a computer system capable of controlling the positioning of the dispensing head of the spraying device on the ophthalmic lens and dispensing the coating liquid. Those spraying coating processes are described in U.S. Pat. No. 6,811,805.

Figure 1:
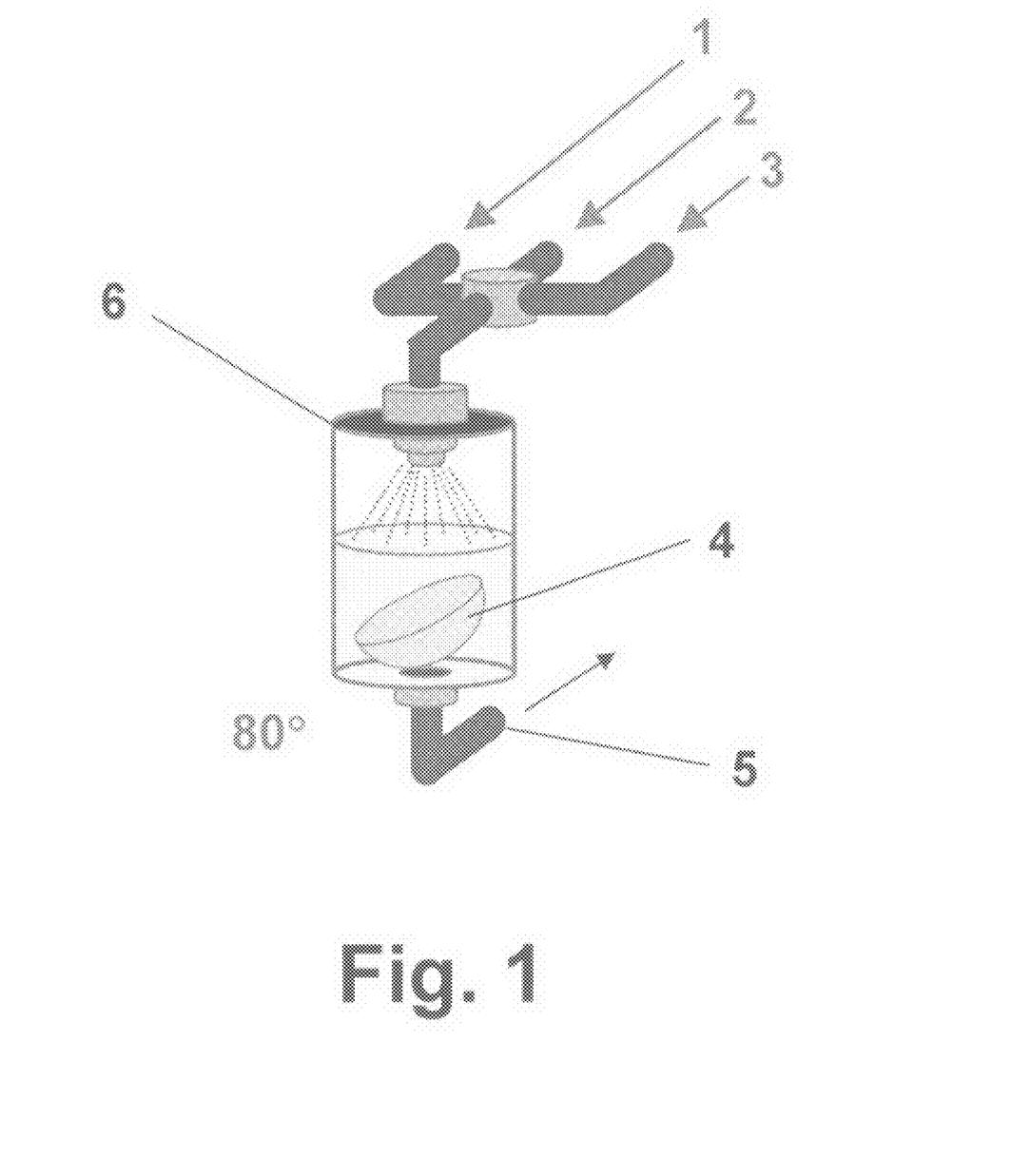
FIG. 1 illustrates schematically a device for applying an LbL coating to a silicone hydrogel contact lens according to a preferred embodiment.

FIG. 1 illustrates a device for implementing a method of the invention. A silicone hydrogel contact lens 4 is placed in a cell 6 which has three fluid inlets (1, 2, 3) connected to a spraying means on top of the cell 6 and one outlet 5. Under a computer control, first, solution 1 (e.g., a PAA solution) is first introduced into cell to apply a layer of PAA and after for example 5 seconds, the solution 1 is withdrawn from the cell 6 through the outlet 5 at the bottom. Second, water is introduced into through inlet 2 into the cell 6 to rinse the lens and then removed from the cell 6. Finally, solution 3 (e.g., PVP solution) is introduced through inlet 3 into the cell 6 to apply a top layer of PVP onto the lens and then removed from the cell 6. The coating time and rinsing time can be controlled by the computer.

Figure 2:
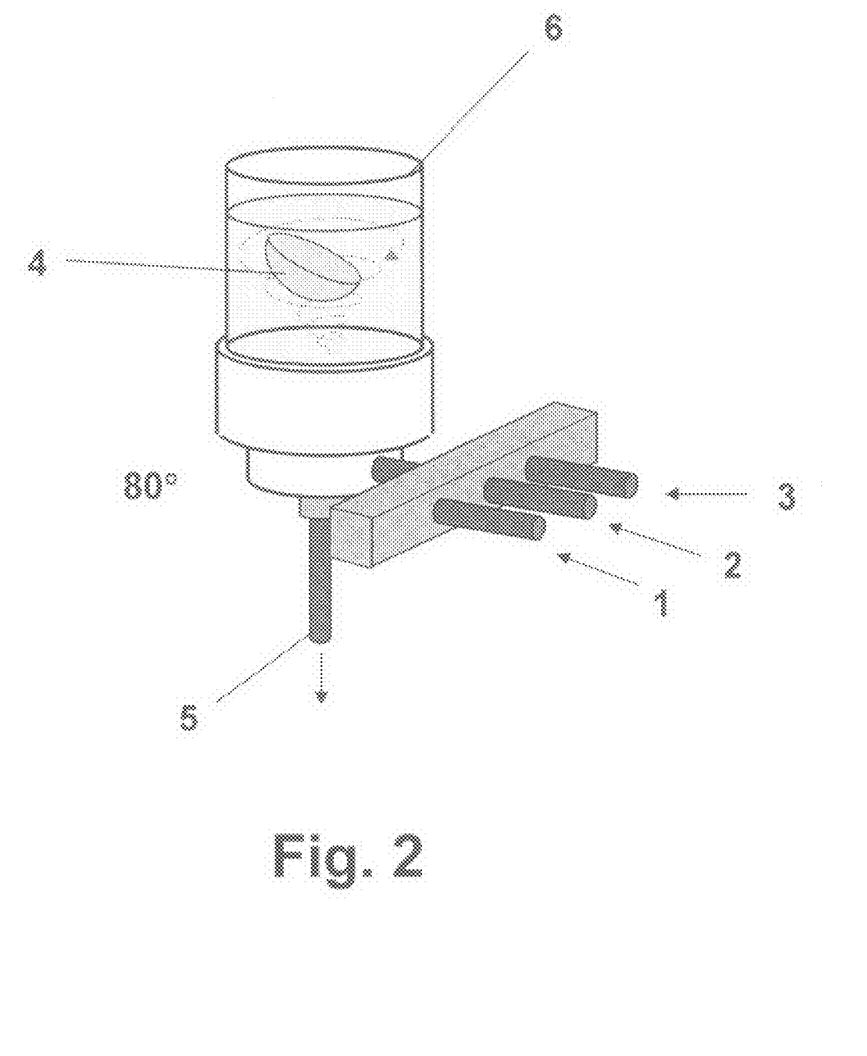
FIG. 2 illustrates schematically a device for applying an LbL coating to a silicone hydrogel contact lens according to another preferred embodiment.

FIG. 2 illustrates another device for implementing a method of the invention. This design is different from the device shown in FIG. 1 in that each coating and rinsing solution is introduced from the bottom of the cell 6. The stream of the solution will spin the lens in the cell 6. The operation of coating and rinsing can be fully automatic under control of a computer. The coating time and rinsing time can be controlled by the computer.

In accordance with the invention, a coating material for forming LbL coating needs to have a hydrophobic backbone. Although the inventors do not wish to be bound by any particular theory, it is believed that through hydrophobic-hydrophobic interaction, the hydrophobic backbone of a coating material may strongly interact with the hydrophobic surface areas of a silicone hydrogel contact lens to anchor the coating material onto the lens surface. It is also believed that at a higher coating temperature, molecules of a coating material might be able to be in more close contact with the hydrophobic surface areas of the lens and then "trapped" there once the temperature drops.

The temperature of a coating solution is preferably above 50° C., more preferably above about 60° C., even more preferably above about 70° C., most preferably at about 80° C. or above.

The polyionic materials that may be employed in the present invention include polyanionic and polycationic polymers with a hydrophobic backbone and charged or ionizable pendant groups. Preferably, the polyionic materials are polyanionic polymers.

Examples of suitable polyanionic polymers include, without limitation a linear polyacrylic acid (PAA), a branched polyacrylic acid, a polymethacrylic acid (PMA), a polyacrylic acid or polymethacrylic acid copolymer, a maleic or fumaric acid copolymer, a poly(styrenesulfonic acid) (PSS). Examples of a branched polyacrylic acid include a Carbophil® or Carbopol® type from Goodrich Corp. Examples of a copolymer of acrylic or methacrylic acid include a copolymerization product of an acrylic or methacrylic acid with a vinyl monomer including, for example, acrylamide, N,N-dimethyl acrylamide or N-vinylpyrrolidone. A preferred polyanionic polymer with a hydrophobic backbone is a linear or branched polyacrylic acid or an acrylic acid copolymer. A more preferred anionic polymer is a linear or branched polyacrylic acid. A branched polyacrylic acid in this context is to be understood as meaning a polyacrylic acid obtainable by polymerizing acrylic acid in the presence of suitable (minor) amounts of a di- or multi-vinyl compound.

Examples of polycationic polymers with a hydrophobic backbone include, without limitation, a polyallylamine (PAH), a polyethyleneimine (PEI), a polyvinylamine, a poly(vinylbenzyl-tri-$C_1$-$C_4$-alkylammonium salt), poly(vinylpyridinium salt), polyquat. The above mentioned polymers comprise in each case the free amine, a suitable salt thereof as well as any quaternized form, if not specified otherwise.

Any suitable non-charged hydrophilic polymers with a hydrophobic backbone can be used in the invention. They are preferably polyvinyl alcohols (PVAs), more preferably a homopolymer of a vinyl lactam, a copolymer of at least one vinyl lactam in the presence or in the absence of one or more hydrophilic vinylic comonomers, or mixtures thereof.

PVA is a highly biocompatible material used widely in ophthalmic products, especially wetting drops or artificial tears for ocular comfort (e.g., HypoTears™, etc.). PVAs of all kinds, for example those with low, medium or high polyvinyl acetate contents may be employed. Polyvinyl alcohols employed in the present invention are known and are commercially available, for example under the brand name Mowiol® from KSE (Kuraray Specialties Europe).

In accordance with the invention, the vinyl lactam has a structure of formula (I)

wherein R is an alkylene di-radical having from 2 to 8 carbon atoms; $R_1$ is hydrogen, alkyl, aryl, aralkyl or alkaryl, preferably hydrogen or lower alkyl having up to 7 carbon atoms, and, more preferably, up to 4 carbon atoms, such as, for example, methyl, ethyl or propyl; aryl having up to 10 carbon atoms, and also aralkyl or alkaryl having up to 14 carbon atoms; and $R_2$ is hydrogen or lower alkyl having up to 7 carob atoms and, more preferably, up to 4 carbon atoms, such as, for example, methyl, ethyl or propyl.

A preferred non-charged hydrophilic polymer is a copolymer derived from a vinyl lactam which is a heterocyclic monomer of formula (I) containing from 4 to 6 carbon atoms in the heterocyclic ring, or a mixture thereof. A more preferred non-charged hydrophilic polymer is a copolymer derived from a vinyl lactam which is a heterocyclic monomer of formula (I) containing 4 carbon atoms in the heterocyclic ring, or a mixture thereof. An even more preferred non-charged hydrophilic polymer is a copolymer derived from a vinyl lactam which is a heterocyclic monomer of formula (I) containing 4 carbon atoms in the heterocyclic ring and wherein $R_1$ and $R_2$ are each independently of the other hydrogen or lower alkyl, or a mixture thereof. A most preferred non-charged hydrophilic polymer is polyvinylpyrrolidone (PVP).

In accordance with the present invention, coating solutions can be prepared in a variety of ways. Preferably, a coating solution can be formed by dissolving a coating material in water. The concentration of a coating material in a solution can generally vary depending on the particular materials being utilized, the desired coating thickness, and a number of other factors. It may be typical to formulate a relatively dilute aqueous solution of a coating material. For example, a coating material concentration can be between about 0.0001% to about 0.25% by weight, between about 0.005% to about 0.10% by weight, or between about 0.01% to about 0.05% by weight.

In order to alter various characteristics of the coating, such as thickness, the molecular weight of the coating materials can be varied. In particular, as the molecular weight is increased, the coating thickness generally increases.

In accordance with the invention, an LbL coating comprises at least one layer of a first polyionic material with a hydrophobic backbone and a non-charged hydrophilic polymer with a hydrophobic backbone. The first polyionic material is preferably a polyanionic polymer.

In a more preferred embodiment, the LbL coating comprises at least one innermost layer of polyacrylic acid (PM) and at least one capping layer of polyvinylpyrrolidone.

In a preferred embodiment of the invention, the method further comprises a step of, prior to contacting with the first coating solution, rinsing the contact lens with an organic solvent or a mixture of organic solvents at room temperature.

In another preferred embodiment, the method further comprises a step of rinsing the contact lens coated with the first polyionic material with water at room temperature.

In another aspect, the invention provides a method for making a silicone hydrogel contact lens, comprising the steps of: (a) cast-molding a silicone hydrogel contact lens from a silicone hydrogel lens-forming material, wherein the silicone-hydrogel lens-forming material comprises at least one member selected from the group consisting of a silicone-containing vinylic monomer, a silicone-containing macromer with ethylenically unsaturated groups, a crosslinkable silicone-containing prepolymer, and mixtures thereof; (b) contacting the contact lens with a first coating solution having a temperature of from about 45° C. to about 95° C. to form a prime coating which is not covalently attached to the contact lens, wherein the first coating solution includes a polyionic polymeric material having a first hydrophobic backbone and multiple ionizable or charged pendant groups, wherein the prime coating comprises at least one layer of the polyanionic material; and (c) contacting said contact lens with a second coating solution having a temperature of from about 45° C. to about 95° C. to form a top coating over the prime coating, wherein the second coating solution contains a non-charged hydrophilic polymer having a second hydrophobic backbone, wherein the top coating comprises at least one layer of the hydrophilic polymer.

A "silicone hydrogel lens-forming material" refers to a polymerizable composition which can be cured (i.e., polymerized and/or crosslinked) thermally or actinically or chemically to obtain a crosslinked silicone-containing polymer. Lens-forming materials are well known to a person skilled in the art. In accordance with the invention, a silicone hydrogel lens-forming material comprises at least one silicon-containing monomer or macromer, or can be any lens formulations for making soft contact lenses. Exemplary lens formulations include without limitation the formulations of lotrafilcon A, lotrafilcon B, etafilcon A, genfilcon A, lenefilcon A, polymacon, acquafilcon A, balafilcon, senofilcon A, and the like. A lens-forming material can further include other components, such as an initiator (e.g., a photoinitiator or a thermal initiator), a visibility tinting agent, UV-blocking agent, photosensitizers, and the like. Preferably, a silicone hydrogel lens-forming material used in the present invention comprises a silicone-containing macromer.

Examples of silicone-containing monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris(pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy)silane, and represented by CAS No. 17096-07-0. The term "TRIS" also includes dimers of 3-methacryloxypropyltris(trimethylsiloxy)silane.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

Examples of silicone-containing prepolymers include without limitation those disclosed in US Patent Application Publication No. US 2001-0037001 A1 and U.S. Pat. No. 6,039,913, which are incorporated herein by references in their entireties. Preferably, the prepolymers used in the invention are previously purified in a manner known per se, for example by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated aqueous solutions that are free, or at least substantially free, from reaction products, such as salts, and from starting materials, such as, for example, non-polymeric constituents. The preferred purification process for the prepolymers used in the process according to the invention, ultrafiltration, can be carried out in a manner known per se. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner.

In accordance with the present invention, a silicone hydrogel lens-forming material can also comprise a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A silicone hydrogel lens-forming material can also comprises a hydrophobic monomer. By incorporating a certain amount of hydrophobic vinylic monomer in a polymerizable fluid composition, the mechanical properties (e.g., modulus of elasticity) of the resultant polymer may be improved.

A silicone hydrogel lens-forming material can further comprise an antimicrobial agent, preferably antimicrobial metal nanoparticles, more preferably silver nanoparticles.

A silicone hydrogel lens-forming material can further comprise a leachable wetting agent. A "leachable wetting agent" is intended to describe a wetting material that is not covalently attached to the polymer matrix of a silicone hydrogel contact lens.

Any non-crosslinkable hydrophilic polymers can be used as leachable wetting agent in the invention. Exemplary non-crosslinkable hydrophilic polymers include, but are not limited to, polyvinylalcohols (PVAs), polyethylene oxide, polyethylene-polypropylene block copolymers, polyamides, polyimides, polylactone, a homopolymer of a vinyl lactam of formula (I) shown above, a copolymer of at least one vinyl lactam of formula (I) shown above in the presence or in the absence of one or more hydrophilic vinylic comonomers, a homopolymer of acrylamide or methaacrylamide, a copolymer of acrylamide or methacrylamide with one or more hydrophilic vinylic monomers, mixtures thereof.

In accordance with the present invention, a silicone hydrogel lens-forming material can further comprise various components, such as cross-linking agents, a chain transfer agent, initiator, UV-absorbers, inhibitors, fillers, visibility tinting agents (e.g., dyes, pigments, or mixtures thereof, and the like, as known to a person skilled in the art.

In accordance with the present invention, a silicone hydrogel lens-forming material can be a solution or a solvent-free liquid or melt at a temperature below 60° C. A person skilled in the art will known well how to prepare silicone hydrogel lens-forming material.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming material is cured actinically under a spatial limitation of actinic radiation to form a silicone hydrogel contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In another preferred embodiment, where a lens-forming material is a solution (dissolved in water, a mixture of water and a water miscible organic solvent, or an organic solvent), solvent-free liquid, or melt of one or more silicone-containing prepolymers with ethylenically unsaturated groups optionally in presence of other components, reusable molds are used and the lens-forming material is cured actinically under a spatial limitation of actinic radiation to form a colored contact lens. Examples of silicone-containing prepolymers include without limitation those disclosed in US Patent Application Publication No. US 2001-0037001 A1 and U.S. Pat. No. 6,039,913, which are incorporated herein by references in their entireties. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

In this case, the lens-forming material is put into a mold consisting of two mold halves, the two mold halves not touching each other but having a thin gap of annular design arranged between them. The gap is connected to the mold cavity, so that excess lens material can flow away into the gap. Instead of polypropylene molds that can be used only once, it is possible for reusable quartz, glass, sapphire molds to be used, since, following the production of a lens, these molds can be cleaned rapidly and effectively off the uncrosslinked prepolymer and other residues, using water or a suitable solvent, and can be dried with air. Reusable molds can also be made of Topas® COC grade 8007-S10 (clear amorphous copolymer of ethylene and norbornene) from Ticona GmbH of Frankfurt, Germany and Summit, N.J. Because of the reusability of the mold halves, a relatively high outlay can be expended at the time of their production in order to obtain molds of extremely high precision and reproducibility. Since the mold halves do not touch each other in the region of the lens to be produced, i.e. the cavity or actual mold faces, damage as a result of contact is ruled out. This ensures a high service life of the molds, which, in particular, also ensures high reproducibility of the contact lenses to be produced.

The two opposite surfaces (anterior surface and posterior surface) of a contact lens are defined by the two molding surfaces while the edge is defined by the spatial limitation of actinic irradiation rather than by means of mold walls. Typically, only the lens-forming material within a region bound by the two molding surfaces and the projection of the well defined peripheral boundary of the spatial limitation is crosslinked whereas any lens-forming material outside of and immediately around the peripheral boundary of the spatial limitation is not crosslinked, and thereby the edge of the contact lens should be smooth and precise duplication of the dimension and geometry of the spatial limitation of actinic radiation. Such method of making contact lenses are described in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

A spatial limitation of actinic radiation (or the spatial restriction of energy impingement) can be effected by masking for a mold that is at least partially impermeable to the particular form of energy used, as illustrated in U.S. patent application Ser. No. 08/274,942 filed Jul. 14, 1994 and U.S. Pat. No. 6,627,124 (herein incorporated by reference in their entireties) or by a mold that is highly permeable, at least at one side, to the energy form causing the crosslinking and that has mold parts being impermeable or of poor permeability to the energy, as illustrated in U.S. patent application Ser. No. 10/732,566 filed Dec. 10, 2003, Ser. No. 10/721,913 filed Nov. 25, 2003 and U.S. Pat. No. 6,627,124 (herein incorporated by reference in their entireties). The energy used for the crosslinking is radiation energy, especially UV radiation, gamma radiation, electron radiation or thermal radiation, the radiation energy preferably being in the form of a substantially parallel beam in order on the one hand to achieve good restriction and on the other hand efficient use of the energy.

Above described various embodiments and preferred embodiments of coating techniques, coating materials, and coating temperature can be used in this aspect of the invention.

In a further aspect, the invention provides a silicone hydrogel contact lens made according to a method of the invention described above. The contact lens of the invention comprises a core silicone hydrogel material and a hydrophilic coating, wherein the core silicone hydrogel material is the copolymerization product of a silicone hydrogel lens-forming material, wherein the silicone-hydrogel lens-forming material comprises at least one member selected from the group consisting of a silicone-containing vinylic monomer, a silicone-containing macromer with ethylenically unsaturated groups, a crosslinkable silicone-containing prepolymer, and mixtures thereof, wherein the hydrophilic coating is not covalently attached to the core silicone hydrogel material and comprises one innermost layer of a polyanionic polymeric material with a first hydrophobic backbone and one outmost layer of a non-charge hydrophilic polymer with a second hydrophobic backbone, wherein the silicone hydrogel contact lens has an oxygen permeability of at least 40 barres, a wettable surface characterized by an averaged water contact angle of 80 degrees or less and a good coating durability characterized by surviving a digital rubbing test or repeated autoclave test.

Above described various embodiments and preferred embodiments of coating techniques, coating materials, and coating temperature can be used in this aspect of the invention.

In a preferred embodiment, a silicone hydrogel contact lens comprises at least one antimicrobial agent, preferably silver nanoparticles in an amount sufficient to have an antimicrobial activity characterized by having at least a 5-fold reduction ($\geqq$80% inhibition), preferably at least a 1-log reduction ($\geqq$90% inhibition), more preferably at least a 2-log reduction ($\geqq$99% inhibition), of viable microorganisms (e.g., *Pseudomonas aeruginosa* GSU #3, or *Staphylococcus aureus* ATCC #6538), preferably by having a prolong antimicrobial activity (i.e., effective antimicrobial activity after direct contact with a body fluid over an extended period of time). Antimicrobial activity can be determined according to procedure described in the Examples of U.S. patent application Ser. No. 10/891,407 filed on Jul. 14, 2004 (herein incorporated by reference in its entirety).

As used herein, a "prolong antimicrobial activity" is characterized by having at least a 5-fold reduction ($\geqq$80% inhibition), preferably at least a 1-log reduction ($\geqq$90% inhibition), more preferably at least a 2-log reduction ($\geqq$99% inhibition), of viable microorganisms (e.g., *Pseudomonas aeruginosa* GSU #3, or *Staphylococcus aureus* ATCC #6538) after at least 5, preferably at least 10, more preferably at least 20, even more preferably at least 30 consecutive soaking/rinsing cycles, each cycle comprising soaking/rinsing one lens in a phosphate buffered saline (PBS) for a period of time from about 24 to about 72 hours, as shown in the Examples of U.S. patent application Ser. No. 10/891,407 filed on Jul. 14, 2004 (herein incorporated by reference in its entirety).

A silicone hydrogel contact lens of the invention has a wettable surface characterized by having an averaged water contact angle of about 80 degrees or less, preferably about 70 degrees or less, more preferably about 60 degrees or less, even more preferably about 50 degrees or less.

A silicone hydrogel contact lens of the invention has an oxygen permeability of at least 40 barres, preferably at least about 50 barrers, more preferably at least about 65 barrers, even more preferably at least about 80 barrers. In accordance with the invention, an oxygen permeability is an apparent (directly measured when testing a sample with a thickness of about 100 microns) oxygen permeability according to procedures described in Examples.

A silicone hydrogel contact lens of the invention can further have an elastic modulus of about 1.5 MPa or less, preferably about 1.2 MPa or less, more preferably about 1.0 or less, even more preferably from about 0.4 MPa to about 1.0 MPa.

A silicone hydrogel contact lens of the invention further has an Ionoflux Diffusion Coefficient, D, of, preferably at least about $1.5 \times 10^{-6}$ mm$^2$/min, more preferably at least about $2.6 \times 10^{-6}$ mm$^2$/min, even more preferably at least about $6.4 \times 10^{-6}$ mm$^2$/min.

A silicone hydrogel contact lens of the invention further has a water content of preferably from about 18% to about 55%, more preferably from about 20% to about 38% by weight when fully hydrated. The water content of a silicone hydrogel contact lens can be measured according to Bulk Technique as disclosed in U.S. Pat. No. 5,849,811.

A silicone hydrogel contact lens of the invention further comprises a leachable wetting agent.

The previous disclosure will enable one having ordinary skill in the art to practice the invention. In order to better enable the reader to understand specific embodiments and the advantages thereof, reference to the following examples is suggested.

Example 1

Surface Hydrophilicity (Wettability) Tests

Water contact angle on a contact lens is a general measure of the surface hydrophilicity (or wettability) of the contact lens. In particular, a low water contact angle corresponds to more hydrophilic surface. Average contact angles (Sessile Drop) of contact lenses are measured using a VCA 2500 XE contact angle measurement device from AST, Inc., located in Boston, Mass. This equipment is capable of measuring advancing or receding contact angles or sessile (static) contact angles. The measurements are performed on fully hydrated contact lenses and immediately after blot-drying.

Coating Intactness Tests

The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated.

Coating Durability Tests

The lenses are digitally rubbed with Solo-Care® multi-purpose lens care solution for 30 times and then rinsed with saline. The digitally rubbed lenses are subjected to Sudan Black test (i.e., coating intactness test described above) to examine whether the coating is still intact. Water contact angles are measured to determine the coating durability.

Alternatively, the lenses are autoclaved at 121° C. for 5 times each lasting 30 minutes and then followed by Sudan Black stain test and/or measurements of water contact angles.

Example 2

Polyacrylic acid (PAA) solution: A solution of polyacrylic acid having a molecular weight of about 90,000, from Poly-Science, is prepared by dissolving a suitable amount of the material in water to form a 0.05M PAA solution. The PAA concentration is calculated based on the repeating unit in PAA. Once dissolved, the pH of the polyanionic PAA solution is adjusted by adding 1N hydrochloric acid until the pH is about 2.0.

Polyvinylpyrrolidone (PVP) solution: A solution of polyvinylpyrrolidone (PVP K-25 from Fluka) having a molecular weight of about 24,000 is prepared by dissolving a suitable amount of the material in water to form a 0.01M PVP solution. The concentration is calculated based on the repeating unit in PVP. Once dissolved, the pH of the PVP solution is adjusted by adding 1N hydrochloric acid until the pH is about 2.0.

Silicone hydrogel contact lenses: Uncoated silicone hydrogel contact lenses are prepared by crosslinking of a composition comprising a silicone-containing prepolymer and photoinitiator in a mold as described in U.S. Published Patent Application No. 2001/0037001. The silicone-containing prepolymer is prepared according to the procedure described in U.S. Published Patent Application No. 2001/0037001 and purified by ultrafiltration.

Coating: Uncoated Lenses are dipped into an ethanol solution for about 30 second at room temperature, wherein the ethanol solution contains 1 gallon of ethylacetate, 1 gallon of methyl iso-butyl ketone, 1 gallon of hydrocarbon solvent per 100 gallon of ethanol and drained of ethanol. Ethanol-rinsed contact lenses are dipped into a PAA solution (0.05 M, pH 2.0) in a temperature bath set up at a room temperature (about 25° C.), 40° C. (the solution temperature is about 36° C.), 60° C. (the solution temperature is about 52° C.), or 80° C. (the solution temperature is about 69° C.) for about 5 seconds and then removed quickly from the PAA solution and drained well. PAA-coated lenses are then placed in D.I. water for a quick rinse at room temperature (1-2 seconds). The water-rinsed lenses are then immersed in a PVP (0.01 mol/L, pH 2) solution in a temperature bath set up at a room temperature (about 25° C.), 40° C., 60° C., or 80° C. for about 5 seconds. The Lenses are removed quickly from the PVP solution, drained well, and then immersed in saline (PBS) at room temperature in order to rinse out PVP solution. The lenses are placed into a vial filled with saline (PBS) and autoclaved at 121° C. for 30 minutes.

Characterization of Coatings on Silicone Hydrogel Lenses

Surface hydrophilicity of contact lenses are characterized by measuring water contact angles as described in Example 1. The intactness of coatings on contact lenses is examined by Sudan Black stain test described in Example 1. The durability of coatings on contact lenses are determined by digital rubbing test described in Example 1 and autoclaving lenses at 121° C. for 5 times each lasting 30 minutes and then followed by Sudan Black stain test.

The results of water contact angles on coated contact lenses are shown in Table 1. It is found that all lenses have a water contact angle of smaller than 50 degrees without rubbing and/or the treatment of five autoclave cycles. The water contact angle decreases as the coating temperature increases, indicating that a more hydrophilic coating can be obtained at a high coating temperature without changing the coating solution composition. By digitally rubbing coated lenses, the contact angles increase and may indicate some damages of the coating on lenses. But, the coating obtained at high temperature, e.g., at 60° C. and 80° C. remains almost intact with minimal alternation, as shown by slight increase in water contact angle. A high coating temperature can enhance the durability of the coating on a lens. This finding is further confirmed by the data obtained with those lenses subjected to five cycles of autoclave.

TABLE 1

| Coating Temperature | Water Contact Angle (degrees) | | |
|---|---|---|---|
| | No Treatment | Rubbing | 5 Autoclaves |
| RT* | 46 | 89 | 64 |
| 40° C. | 44 | 71 | 54 |
| 60° C. | 28 | 41 | 40 |
| 80° C. | 28 | 39 | 40 |

*At room temperature.

Sudan black stain tests of coated lenses without rubbing or 5 autoclaves show that the lenses coated at room temperature have scattered areas stained with Sudan Black dye, lenses coated at 40° C. have a few spots stained with Sudan Black, lenses coated at 60° C. and 80° C. have no noticeable stains. The lenses coated at higher temperature have intact surface coating.

As a control, O2Optix™ lenses, which have a plasma coating, are also subjected to rubbing-Sudan Black Stain test. No stain is observed.

Sudan black stain tests of coated lenses with rubbing show that the lenses coated at temperature have large percentage of areas stained with Sudan Black dye, lenses coated at 40° C. have some areas stained with Sudan Black, lenses coated at 60° C. and 80° C. almost have no stains. The lenses coated at higher temperature have much better durability than the lenses coated at room temperature.

Sudan black stain tests of coated lenses subjected to 5 cycles of autoclave show that the lenses coated at temperature have large percentage of areas stained with Sudan Black dye, lenses coated at 40° C. have some areas stained with Sudan Black, lenses coated at 60° C. and 80° C. almost have no stains. The lenses coated at higher temperature have much better durability than the lenses coated at room temperature.

It is discovered here that when coating is performed at a high temperature, preferably from about 60° C. to about 80° C., one can form a coating on a silicone hydrogel contact lens, wherein the coating has a good wettability (hydrophilicity), intactness, and durability.

Example 3

O2OptiX™ lenses without any surface treatment are coated with PAA and PVP at various temperatures. O2Optix™ lenses are made of lotrafilcon B lens material. PAA and PVP solution are prepared as described in Example 2. The coating process is performed as described in Example 2, except that lenses are dipped in PAA or PVP solution for 5 minutes.

Surface hydrophilicity of contact lenses are characterized by measuring water contact angles as described in Example 1. The intactness of coatings on contact lenses is examined by Sudan Black stain test described in Example 1. The durability of coatings on contact lenses are determined by digital rubbing test described in Example 1 and autoclaving lenses at 121° C. for 5 times each lasting 30 minutes and then followed by Sudan Black stain test.

The results of water contact angles on coated contact lenses are shown in Table 2. It is found that all lenses have a water contact angle of smaller than 60 degrees without rubbing and/or the treatment of five autoclave cycles. The water contact angle decreases as the coating temperature increases, indicating that a more hydrophilic coating can be obtained at a higher coating temperature without changing the coating solution composition. By digitally rubbing coated lenses, the contact angles increase and may indicate some damages of the coating on lenses. But, the coating obtained at high temperature, e.g., at 60° C. and 80° C. has a smaller change in contact angle and has an contact angle smaller than 90 degrees, still hydrophilic. In contrast, the coating obtained at room temperature has a contact angle of about 116 degrees and becomes hydrophobic after digital rubbing. A higher coating temperature can enhance the durability of the coating on a lens. This finding is further confirmed by the data obtained with those lenses subjected to five cycles of autoclave. The coating obtained at room temperature has a contact angle of about 75 degrees after autoclave 5 times, about 20 degrees jump in contact angle whereas a coating obtained at a higher coating temperature has an almost constant contact angle.

TABLE 2

| Coating Temperature | Water Contact Angle (degrees) | | |
|---|---|---|---|
| | No Treatment | Rubbing | 5 Autoclaves |
| RT* | 56 | 116 | 75 |
| 40° C. | 47 | 100 | 51 |
| 60° C. | 42 | 78 | 36 |
| 80° C. | 46 | 86 | 45 |

*At room temperature.

Sudan black stain tests of coated lenses without rubbing or 5 autoclaves show that some lenses coated at room temperature have islands stained with Sudan Black dye, lenses coated at 40° C., 60° C., and 80° C. have a few spots stained with Sudan Black or no noticeable stains. The lenses coated at higher temperature have more intact surface coating.

Sudan black stain tests of coated lenses with rubbing show that the lenses coated at room temperature have large percentage of areas stained with Sudan Black dye, lenses coated at 40° C. have some areas stained with Sudan Black, lenses coated at 60° C. and 80° C. have a few stains. The lenses coated at higher temperature have much better durability than the lenses coated at room temperature.

Sudan black stain tests of coated lenses subjected to 5 cycles of autoclave show that the lenses coated at room temperature or at 40° C. have areas stained with Sudan Black similar to those before subjecting to 5 times of autoclave, and lenses coated at 60° C. and 80° C. almost have no stains. The lenses coated at higher temperature have much better durability than the lenses coated at room temperature.

It is discovered here that when coating is performed at a high temperature, preferably from about 60° C. to about 80° C., one can form a coating on a silicone hydrogel contact lens, wherein the coating has a good wettability (hydrophilicity), intactness, and durability.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part. Therefore, the spirit and scope of the appended claims should not be limited to the description of the preferred versions contained therein.

What is claimed is:

1. A method of applying a hydrophilic coating onto a silicone hydrogel contact lens, comprising the steps of:
    (a) prior to contacting with a first coating solution for forming a prime coating which is not covalently attached to the contact lens, rinsing an uncoated contact lens with an organic solvent or a mixture of organic solvents at room temperature;
    (b) contacting the rinsed contact lens with the first coating solution having a temperature of from about 45° C. to about 95° C. to form the prime coating, wherein the first coating solution includes a polyanionic material having a first hydrophobic backbone and multiple ionizable pendant groups, wherein the first coating solution has a pH sufficient low to substantially prevent the ionizable groups from ionizing, wherein the prime coating comprises at least one layer of the polyanionic material;
    (c) rinsing the contact lens coated with the polyanionic material with water at room temperature; and
    (d) applying a top coating over the prime coating of the contact lens by contacting said contact lens, which is rinsed in step (c) with water at room temperature, with a second coating solution having a temperature of from about 45° C. to about 95° C. to form the hydrophilic coating on the contact lens, wherein the second coating solution contains a non-charged hydrophilic polymer having a second hydrophobic backbone,
wherein the formed hydrophilic coating on the contact lens exhibits an increased hydrophilicity and a good durability characterized by surviving a digital rubbing test or 5 autoclave test.

2. The method of claim 1, wherein the polyanionic polymeric material is selected from the group consisting of a linear polyacrylic acid, a branched polyacrylic acid, a polymethacrylic acid, a copolymer of acrylic acid with at least one hydrophilic vinylic monomer, a copolymer of methacrylic acid with at least one vinylic monomer, and a mixture thereof.

3. The method of claim 2, wherein the non-charged hydrophilic polymer is selected from the group consisting of a polyvinyl alcohol, a homopolymer of a vinyl lactam, a copolymer of at least one vinyl lactam with at least one hydrophilic vinylic monomer, and a mixture thereof, wherein the vinyl lactam has a structure of formula (I)

(I)

wherein R is an alkylene di-radical having from 2 to 8 carbon atoms; $R_1$ is hydrogen, methyl, ethyl or propyl, aryl having up to 10 carbon atoms, or aralkyl or alkaryl having up to 14 carbon atoms; and $R_2$ is hydrogen, methyl, ethyl, or propyl.

4. The method of claim 2, wherein the non-charged hydrophilic polymer is polyvinyl pyrrolidone (PVP).

5. The method of claim 2, wherein the contact lens is obtained by cast-molding of a silicone hydrogel lens-forming material, wherein the silicone-hydrogel lens-forming material comprises at least one member selected from the group consisting of a silicone-containing vinylic monomer, a silicone-containing macromer with ethylenically unsaturated groups, a crosslinkable silicone-containing prepolymer, and mixtures thereof.

6. The method of claim 5, wherein the silicone-hydrogel lens-forming material is a solution, solvent-free liquid, or melt of one or more silicone-containing prepolymers with ethylenically unsaturated groups optionally in presence of other components, wherein the lens-forming material is cured actinically under a spatial limitation of actinic radiation in a reusable mold to form the contact lens.

7. The method of claim 2, wherein the temperatures of the first and second coating solutions are from about 50° C. to about 95° C.

8. The method of claim 2, wherein the temperatures of the first and second coating solutions are from about 70° C. to about 95° C.

9. The method of claim 3, wherein the temperatures of the first and second coating solutions are from about 50° C. to about 95° C.

10. The method of claim 3, wherein the temperatures of the first and second coating solutions are from about 70° C. to about 95° C.

11. The method of claim 4, wherein the temperatures of the first and second coating solutions are from about 50° C. to about 95° C.

12. The method of claim 4, wherein the temperatures of the first and second coating solutions are from about 70° C. to about 95° C.

13. The method of claim 5, wherein the temperatures of the first and second coating solutions are from about 50° C. to about 95° C.

14. The method of claim 5, wherein the temperatures of the first and second coating solutions are from about 70° C. to about 95° C.

15. The method of claim 6, wherein the temperatures of the first and second coating solutions are from about 50° C. to about 95° C.

16. The method of claim 6, wherein the temperatures of the first and second coating solutions are from about 70° C. to about 95° C.

17. The method of claim 3, wherein the contact lens is obtained by cast-molding of a silicone hydrogel lens-forming material, wherein the silicone-hydrogel lens-forming material comprises at least one member selected from the group consisting of a silicone-containing vinylic monomer, a silicone-containing macromer with ethylenically unsaturated groups, a crosslinkable silicone-containing prepolymer, and mixtures thereof.

18. The method of claim 17, wherein the silicone-hydrogel lens-forming material is a solution, solvent-free liquid, or melt of one or more silicone-containing prepolymers with ethylenically unsaturated groups optionally in presence of other components, wherein the lens-forming material is cured actinically under a spatial limitation of actinic radiation in a reusable mold to form the contact lens.

19. The method of claim 18, wherein the temperatures of the first and second coating solutions are from about 50° C. to about 95° C.

20. The method of claim 18, wherein the temperatures of the first and second coating solutions are from about 70° C. to about 95° C.

* * * * *